J. F. BENNETT.
ROAD GRADER AND SCRAPER.
APPLICATION FILED AUG. 21, 1912.

1,099,008.

Patented June 2, 1914.

2 SHEETS—SHEET 2.

Witnesses
Einar Larson
M. A. Schmidt

Inventor
J. F. Bennett.
By Eugene T. Thomas
Attorney

UNITED STATES PATENT OFFICE.

JACOB F. BENNETT, OF HERRICK, ILLINOIS.

ROAD GRADER AND SCRAPER.

1,099,008.  Specification of Letters Patent. Patented June 2, 1914.

Application filed August 21, 1912. Serial No. 716,297.

*To all whom it may concern:*

Be it known that I, JACOB F. BENNETT, a citizen of the United States, residing at Herrick, in the county of Shelby and State of Illinois, have invented certain new and useful Improvements in Road Graders and Scrapers, of which the following is a specification.

This invention relates to machines for making roads, and its object is to provide an efficient machine of this kind which can be operated as a grader as well as a scraper, and which is simple in construction.

With these objects in view, the invention consists in a combination and arrangement of parts to be hereinafter described and claimed, reference being had to the accompanying drawings forming a part of this specification.

Figure 1:
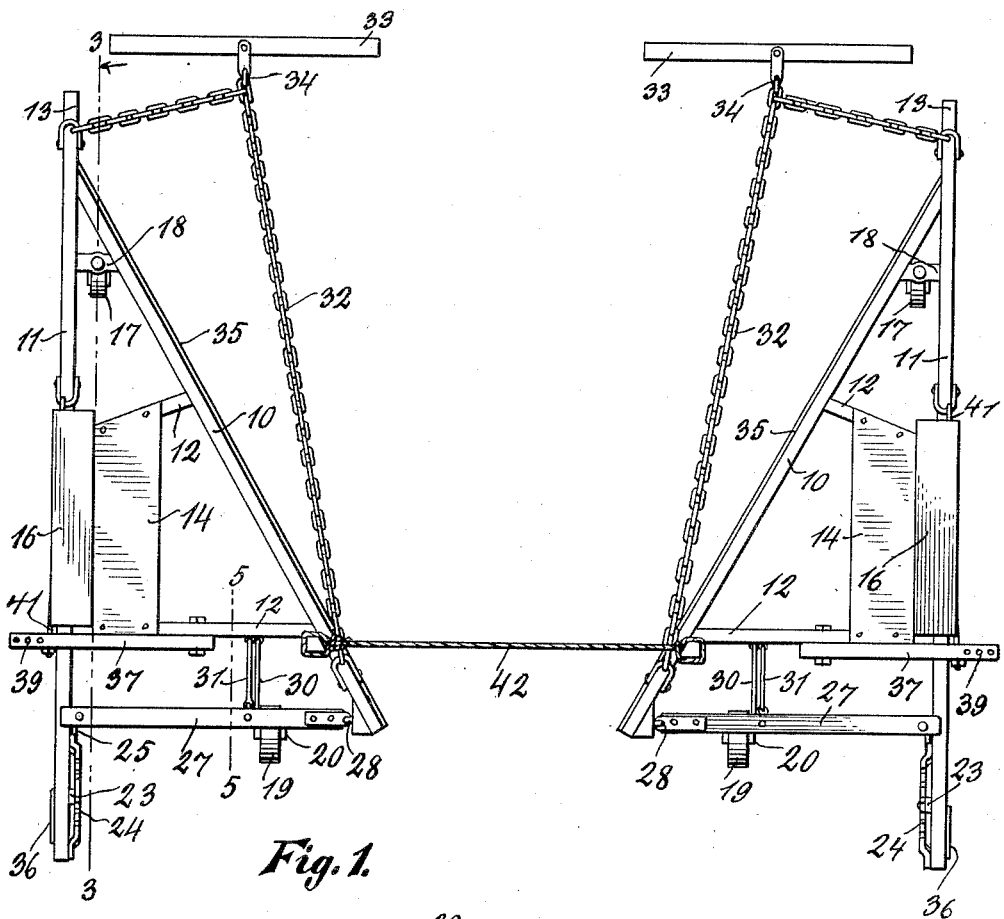
Figure 2:
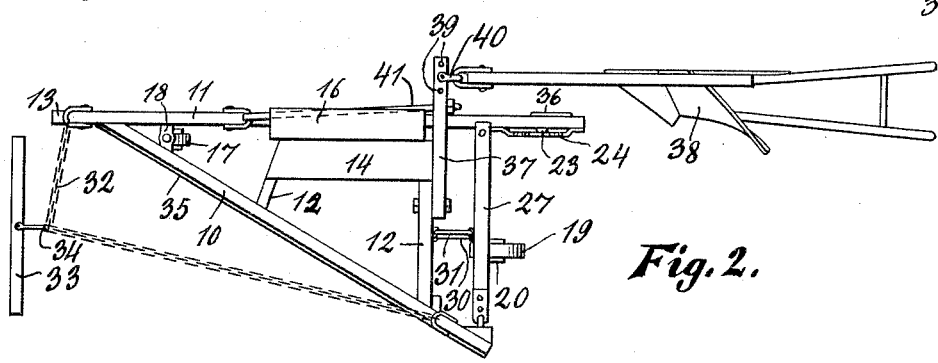
Figure 3:
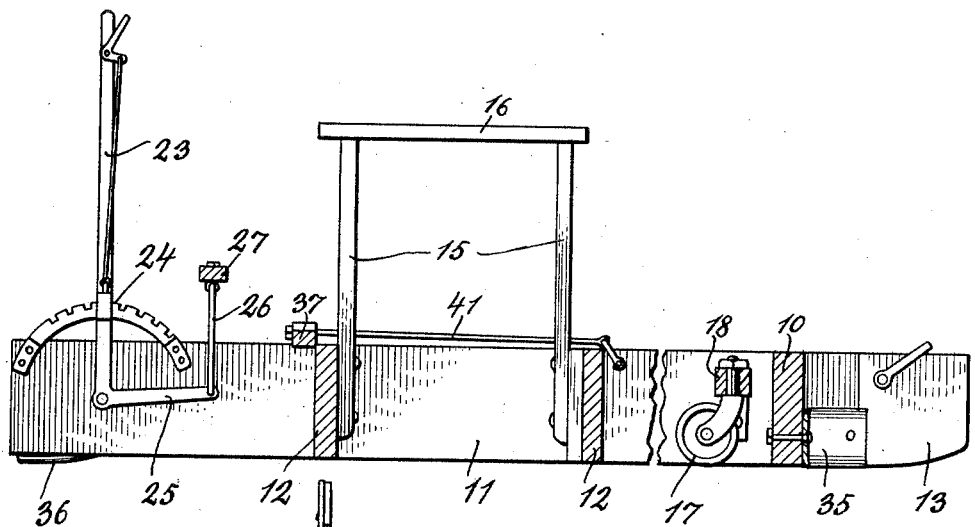
Figure 4:
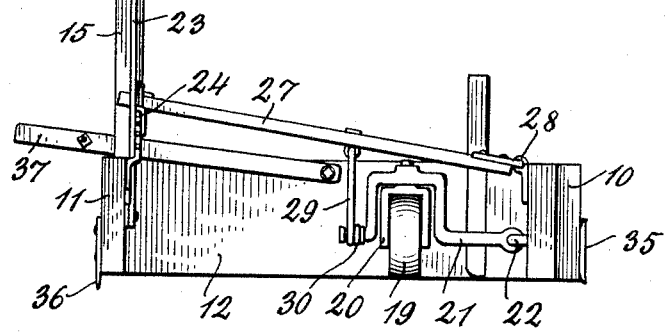
Figure 5:
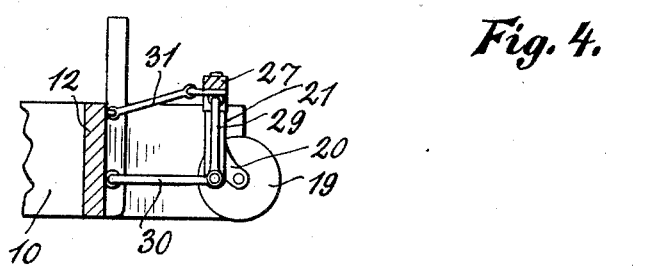

In the drawings—Figures 1 and 2 are plan views showing the machine arranged for different kinds of work. Fig. 3 is a section on the line 3—3 of Fig. 1. Fig. 4 is a rear end view of the machine. Fig. 5 is a cross-section on the line 5—5 of Fig. 1.

Referring specifically to the drawing 10 denotes the mold-board, and 11 the landside of the machine; said parts being rigidly connected by cross-braces 12. The mold-board is connected to the landside a short distance back of the forward end thereof, which leaves a short section 13 of the landside extending forward from the machine, which prevents the clods and dirt from getting past the landside. The braces 12 support a platform 14 for the driver, and also standards 15 carrying a seat 16. The mold-board and landside diverge in the direction of the rear end of the machine.

At the front end of the machine is a caster-wheel 17 carried by a cross-bar 18 extending between the mold-board and the landside. The rear end of the machine is supported on a caster-wheel 19 carried by a fork 20, the stem of which is swiveled in a support 21 hinged at 22 to the mold-board, to swing in a vertical plane. The rear end of the landside carries a hand lever 23 provided with a suitable locking device 24, and having a bend 25 at one end which is connected by a link 26 to a lifting bar 27 which is hinged at 28 to the mold-board to swing in a vertical plane. The lifting bar is connected intermediate its ends by means of a link 29, to the free end of the support 21. A link 30 loosely connects the support to the rear brace 12, and a similar connection 31 is provided between said brace and the lifting bar.

It will be evident from the foregoing that the caster-wheel 19 may be readily raised or lowered upon operating the hand lever 23.

The front end of the landside is beveled at the bottom so that it may pass freely over obstructions, and to said end of the landside is connected one end of a draft chain 32 the other end of which latter is connected to the mold-board, near the rear end thereof. A draft bar 33 is adjustably connected to the chain 32 by means of a hook-clevis 34 to give the mold-board any desired angle to the line of travel of the machine.

The mold-board is fitted with a scraping share 35 which is sharpened on both edges so that it may be reversed. The rear end of the landside carries a small blade 36 which extends a short distance below the same and is designed to cut into the ground for the purpose of holding the landside to run steady and straight and not slide sidewise.

To the rear brace 12 is fastened a beam 37 which extends across the top of the landside and projects a short distance therefrom. The purpose of this beam is to provide for the attachment of a plow 38 as shown in Fig. 2, said plow being hitched to the projecting end of the beam, which latter has apertures 39 for fastening the plow clevis 40. The beam 37 is connected by a brace rod 41 to the landside. The plow travels behind the machine, on the landside thereof, and the attachment enables the plow to get close up to a bank where a plow cannot get with a team hitched directly thereto. This makes the machine very convenient for working hills.

Fig. 1 shows two of the machines working together and connected at their rear ends by a rope or other suitable connection 42 so that they are held parallel and prevented from slipping away sidewise from the dirt. The two machines hitched together as shown bring the dirt from the ditches to the center of the road. One machine counteracts the other, and the dirt is drawn from both sides of the road.

The wheel 19 prevents the share 35 from running too deep. The depth is readily regulated by adjusting the wheel as hereinbefore described, and by means of said wheel the mold-board may be elevated above the ground to drop the accumulated dirt in front thereof.

The machine herein described makes an efficient road grader and level. It is simple in construction and does the work well. The plow first runs a furrow, and the dirt is then run from the furrow toward the middle of the road. The plow then makes another furrow, and the dirt is again run toward the middle of the road, and so on until the road is ready for harrowing. The plow can be run close to a bank to widen the road, and at the same time make a ditch for draining water off the road. If the machine is to be used as a scraper, the hitch will be changed so that the mold-board runs almost square to the dirt with an angle just enough to force the dirt sidewise.

I claim:

A road machine comprising a landside, a mold-board extending therefrom, a cross-brace connecting the landside and mold-board, a support hinged to the mold-board behind the cross-brace to swing in a vertical plane, a wheel carried by the support, a hand lever mounted on the landside and having a bend, a vertically swinging lifting bar hinged to the mold-board above the support, a link connecting the lever bend to the lifting bar, a connection between the lifting bar and the aforesaid support, a loose connection between the cross-brace and the support, and a loose connection between the cross-brace and the lifting bar.

In testimony whereof I affix my signature in presence of two witnesses.

JACOB F. BENNETT.

Witnesses:
J. H. CHERRY,
C. W. KESLER.

---

Copies of this patent may be obtained for five cents each, by addressing the "Commissioner of Patents, Washington, D. C."